July 2, 1929.  E. M. BOLTON  1,719,461
COOKING VESSEL AND LIKE HANDLE
Filed June 21, 1927
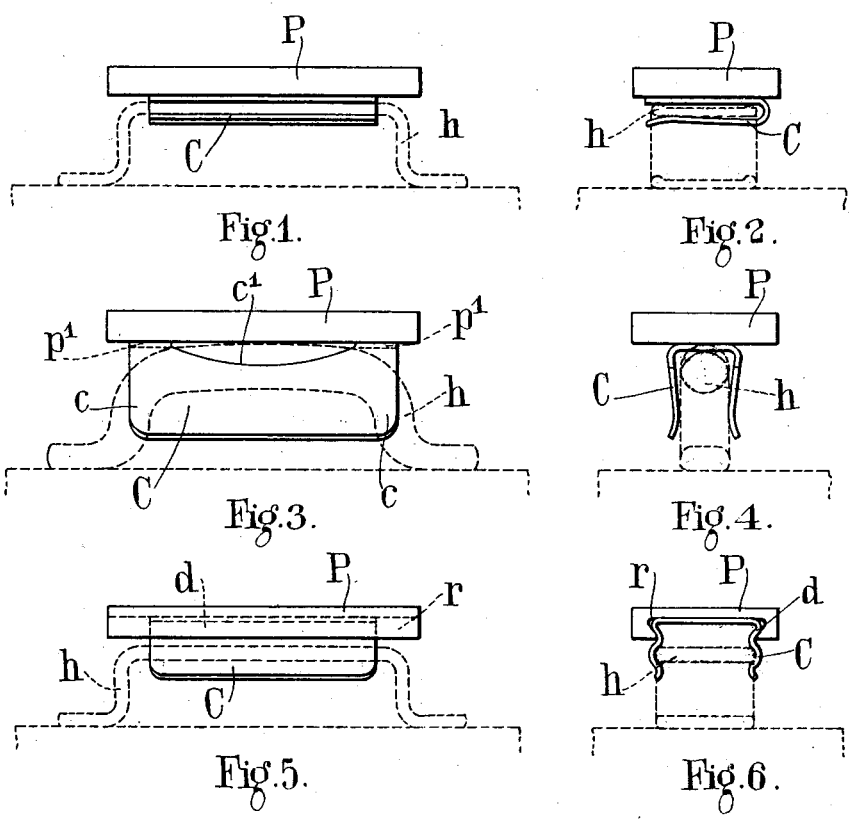
INVENTOR
Edith Mary Bolton
BY: Reeves, Boyer & Bakelar
ATTORNEYS.

Patented July 2, 1929.

1,719,461

UNITED STATES PATENT OFFICE.

EDITH MARY BOLTON, OF GERRARDS CROSS, ENGLAND.

COOKING VESSEL AND LIKE HANDLE.

Application filed June 21, 1927, Serial No. 200,326, and in Great Britain September 24, 1926.

This invention relates to means for the heat insulation of the handles of cooking vessel lids.

A constant source of inconvenience and often of accidents in cooking is the heating of handles of saucepan lids and lids of other such cooking utensils such handles being generally made of metal, and the object of the present invention is the construction of heat insulating means which may be fitted to such handles and may be easily and quickly attached and detached.

In carrying this invention into effect I form a handle of any suitable heat insulating material such as vulcanite, ebonite, wood, and so forth and I form for use in conjunction with such heat insulating handle a spring clip which may be fixed to the same and also to the handle of the lid to be insulated.

My invention may be more clearly understood by reference to the accompanying drawings in which:—

Figs. 1 and 2 show a side and end view of heat insulating handles made according to this invention.

Figs. 3 and 4 are side and end views of a modification of the same and

Figs. 5 and 6 a side and end view of a further modification.

Referring to Figs. 1 and 2, I form a plate or slab P. of any convenient heat insulating material and I attach to the underside of this a metal clip C. having an approximately horizontal return such as may clip tightly upon a handle approximately rectangular in cross section such as is in common use for the lids of cooking vessels and as shown in dotted lines at $h$. Such an insulating handle may be slipped on and off at will or may be left permanently in its place.

Figs. 3 and 4, illustrate a similar insulator but with vertically disposed clips C. and adapted to clip over handles which are of curved or circular cross section. In order to prevent such insulators from moving round transversely on the curved surface of these handles I carry the clip at each end past the downward extending parts of the handles as at $e$. $e$. and by this means they are maintained in the vertical position, and in order to prevent such insulator rocking longitudinally upon the curved upper surface of such handles I cut a hole $e'$. in the base of the clip so that the clip only bears on the insulating plate P. at each end $p'$. $p'$. of the plate and the insulator in this way is prevented from rocking.

Figs. 5 and 6 illustrate a particular method of attaching the spring clips to the heat insulating plate. This method consists in forming the clip with a dovetail extension $d$. on its base and forming the plate with an undercut recess $r$. into which the said dovetail extension of the clip may be forced so that the clip is held firmly in its place. It should be understood that the heat insulating plates may be of any size or shape found convenient and that the spring clips may be formed so as to fit or adapt themselves to any desired type of handle.

What I claim is:—

A heat insulating handle having a spring clip adapted to removably grip an elongated handle of a cooking vessel lid, said spring clip having a dovetailed extension and removably attached to said insulating handle by sliding into an undercut groove in the same.

In witness whereof I have signed this specification.

EDITH MARY BOLTON.